(12) United States Patent
Choi

(10) Patent No.: US 10,129,066 B2
(45) Date of Patent: Nov. 13, 2018

(54) METHOD AND DEVICE FOR ALAMOUTI CODING IN FILTERBANK MULTI-CARRIER TRANSMISSION SYSTEM

(71) Applicant: RESEARCH COOPERATION FOUNDATION OF YEUNGNAM UNIVERSITY, Gyeongsangbuk-do (KR)

(72) Inventor: Kwonhue Choi, Gyeongsangbuk-do (KR)

(73) Assignee: RESEARCH COOPERATION FOUNDATION OF YEUNGNAM UNIVERSITY, Gyeongsangbuk-Do (KR)

( * ) Notice: Subject to any disclaimer, the term of this patent is extended or adjusted under 35 U.S.C. 154(b) by 0 days.

(21) Appl. No.: 15/753,061

(22) PCT Filed: Mar. 29, 2017

(86) PCT No.: PCT/KR2017/003390
§ 371 (c)(1),
(2) Date: Feb. 15, 2018

(87) PCT Pub. No.: WO2017/171384
PCT Pub. Date: Oct. 5, 2017

(65) Prior Publication Data
US 2018/0248729 A1    Aug. 30, 2018

(30) Foreign Application Priority Data
Mar. 29, 2016 (KR) .......................... 10-2016-0037890

(51) Int. Cl.
*H04L 27/01* (2006.01)
*H04L 27/26* (2006.01)
(Continued)

(52) U.S. Cl.
CPC .............. *H04L 27/264* (2013.01); *H04L 1/06* (2013.01); *H04L 1/0668* (2013.01); *H04L 25/02* (2013.01); *H04L 27/26* (2013.01)

(58) Field of Classification Search
CPC ....... H04L 27/264; H04L 1/0668; H04L 1/06; H04L 25/02; H04L 27/26
See application file for complete search history.

(56) References Cited

U.S. PATENT DOCUMENTS

2009/0052577 A1* 2/2009 Wang ..................... H04L 1/009
375/299
2011/0002408 A1   1/2011 Javaudin
(Continued)

OTHER PUBLICATIONS

International Search Report for PCT/KR2017/003390.
(Continued)

*Primary Examiner* — Dac Ha
(74) *Attorney, Agent, or Firm* — The PL Law Group, PLLC

(57) ABSTRACT

An Alamouti coding method includes mapping real number data symbols to a first subcarrier to an (N/2−1)th subcarrier, based on indices of the subcarriers, mapping the mapped real number data symbols and real number data symbols constituting an Alamouti coded symbol pair to an (N/2+1)th subcarrier to an (N−1)th subcarrier, in a frequency inversion scheme with reference to an (N/2)th subcarrier, adjusting a phase of each real number data symbol mapped to the first subcarrier to the (N/2−1)th subcarrier, by using a first phase adjustment value, based on indices of the mapped subcarriers and an index of a time interval, and adjusting a phase of each real number data symbol mapped to the (N/2+1)th subcarrier to the (N−1)th subcarrier, by using a conjugate value of a first phase adjustment value for a corresponding real number data symbol and the real data symbols constituting the Alamouti coded symbol pair.

24 Claims, 9 Drawing Sheets

(51) Int. Cl.
  *H04L 1/06*   (2006.01)
  *H04L 25/02*  (2006.01)

(56) References Cited

U.S. PATENT DOCUMENTS

| | | | |
|---|---|---|---|
| 2011/0280203 A1* | 11/2011 | Han | H04L 1/0031 370/329 |
| 2013/0100914 A1* | 4/2013 | Nakamura | H04B 7/0413 370/329 |
| 2014/0348252 A1 | 11/2014 | Orange | |
| 2015/0180697 A1 | 6/2015 | Orange | |

OTHER PUBLICATIONS

Blel, Ilhem et al., "Alamouti OFDM/OQAM Systems with Time Reversal Technique", Computer Science & Information Technology (CS & IT), pp. 119-130, 2014; See pp. 119-127.

Zakaria, R. et al., "On Interference Cancellation in Alamouti Coding Scheme for Filter Bank Based Multicarrier Systems", Wireless Communication Systems (ISWCS 2013) Aug. 27-30, 2013; See section I-III.

* cited by examiner

FIG. 3
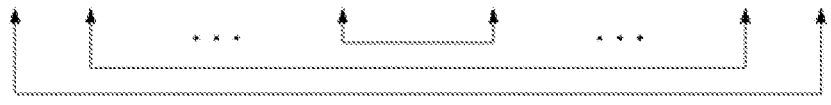
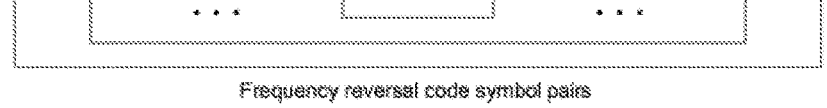

FIG. 4
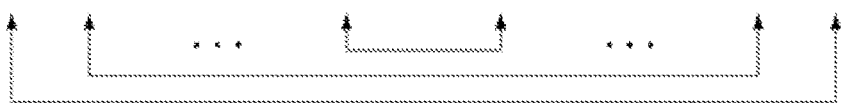
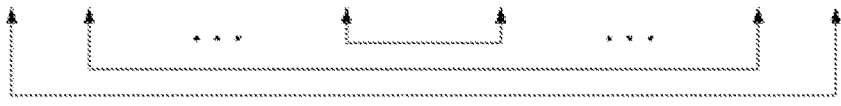

Simulated BERs under multipath fading channels, $E_b/N_o=15dB$, OQPSK

Simulated BERs under multipath fading channels, Eb/No=20dB, OQPSK

Simulated BERs under multipath fading channels, Eb/No=15dB, 16-OQAM

METHOD AND DEVICE FOR ALAMOUTI CODING IN FILTERBANK MULTI-CARRIER TRANSMISSION SYSTEM

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2017/003390, filed Mar. 29, 2017, which claims priority to the benefit of Korean Patent Application No. 10-2016-0037890 filed in the Korean Intellectual Property Office on Mar. 29, 2016, the entire contents of which are incorporated herein by reference.

TECHNICAL FIELD

Exemplary embodiments of the present invention relate to a filter bank multi-carrier transmission technology.

BACKGROUND ART

Unlike an orthogonal frequency division multiplexing (OFDM) transmission scheme, a filter bank multi-carrier transmission scheme has many difficulties in applying an Alamouti code to a filter bank multi-carrier technique due to inherent inter-carrier interference.

In the OFDM transmission scheme, ICI between antennas occurs in a special case using distributed transmission antennas. In order to eliminate the ICI, a frequency reversal Alamouti code technique was used.

SUMMARY

Exemplary embodiments of the present invention are intended to provide an Alamouti coding device and method for eliminating inter-carrier interference in filter bank multi-carrier transmission.

According to one exemplary embodiment of the present invention, there is provided an Alamouti coding method including: mapping a plurality of real valued data symbols to a first to an (N/2−1)th subcarriers among N subcarriers (where N is an even natural number) on the basis of indices of the subcarriers; mapping real valued data symbols, each of which forms an Alamouti pair with each of the real valued data symbols mapped to the first subcarrier to the (N/2−1)th subcarrier, to an (N/2+1)th to an (N−1)th subcarriers in a frequency reversal scheme with reference to an (N/2)th subcarrier; adjusting a phase of each of the real valued data symbols mapped to the first to the (N/2−1)th subcarriers using a first phase adjustment value based on indices of the mapped subcarriers and an index of a time interval in which each of the data symbols is transmitted; and adjusting a phase of each of the real valued data symbols mapped to the (N/2+1)th to the (N−1)th subcarriers using a second phase adjustment value that is a conjugate value of the first phase adjustment value for a real valued data symbol which forms an Alamouti coded symbol pair with the corresponding real valued data symbol.

The mapping in the frequency reversal scheme may include mapping the real valued data symbols forming the Alamouti coded symbol pairs to the (N/2+1)th to the (N−1)th subcarriers such that each of the Alamouti coded symbol pairs is mapped to the subcarriers positioned symmetrically on a frequency axis on the basis of the (N/2)th subcarrier.

The first phase adjustment value may satisfy an Equation below $$\zeta_{l,m} = \begin{cases} 1(\text{or}-1) & \text{if } l+m = \text{even} \\ j(\text{or}-j) & \text{if } l+m = \text{odd} \end{cases}$$

where l denotes a subcarrier index having a value between 1 and N/2−1, m denotes an index of the time interval and $\zeta_{l,m}$ denotes the first phase adjustment value, and the second phase adjustment value may satisfy an Equation below $$\zeta_{N-l,m} = \zeta_{l,m}^*$$

where $\zeta_{N-l,m}$ denotes the second phase adjustment value.

The Alamouti coding method may further include mapping a null data symbol to the (N/2)th subcarrier and an Nth subcarrier among the N subcarriers.

The Alamouti coding method may further include dividing all of available subcarriers into a plurality of sub-blocks consisting of the N subcarriers.

The number of sub-blocks may be determined based on a frequency selective fading channel characteristic.

According to another exemplary embodiment of the present invention, there is provided an Alamouti coding device including: a symbol mapper configured to map a plurality of real valued data symbols to a first to an (N/2−1)th subcarriers among N subcarriers on the basis of indices of the subcarriers and map real valued data symbols, each of which forms an Alamouti coded symbol pair with each of the real valued data symbols mapped to the first to the (N/2−1)th subcarriers, to an (N/2+1)th to an (N−1)th subcarriers in a frequency reversal scheme with respect to an (N/2)th subcarrier; and a phase adjuster configured to adjust a phase of each of the real valued data symbols mapped to the first to the (N/2−1)th subcarriers using a first phase adjustment value based on indices of the mapped subcarriers and an index of a time interval in which each of the data symbols is transmitted, and adjust a phase of each of the real valued data symbols mapped to the (N/2+1)th to the (N−1)th subcarriers using a second phase adjustment value that is a conjugate value of the first phase adjustment value for a real valued data symbol which forms an Alamouti coded symbol pair with the corresponding real valued data symbol.

The symbol mapper may map the real valued data symbols forming the Alamouti coded symbol pairs to the (N/2+1)th to the (N−1)th subcarriers such that each of the Alamouti coded symbol pairs is mapped to the subcarriers positioned symmetrically on a frequency axis on the basis of the (N/2)th subcarrier.

The first phase adjustment value may satisfy an Equation below $$\zeta_{l,m} = \begin{cases} 1(\text{or}-1) & \text{if } l+m = \text{even} \\ j(\text{or}-j) & \text{if } l+m = \text{odd} \end{cases}$$

where l denotes a subcarrier index having a value between 1 and N/2−1, m denotes an index of the time interval and $\zeta_{l,m}$ denotes the first phase adjustment value, and the second phase adjustment value may satisfy an Equation below $$\zeta_{N-l,m} = \zeta_{l,m}^*$$

where $\zeta_{N-l,m}$ denotes the second phase adjustment value.

The symbol mapper my map a null data symbol to the (N/2)th subcarrier and an Nth subcarrier among the N subcarriers.

The symbol mapper may divide all of available subcarriers into a plurality of sub-blocks consisting of the N subcarriers.

The number of sub-blocks may be determined based on a frequency selective fading channel characteristic.

According to still another exemplary embodiment, there is provided an Alamouti coding method including: mapping a plurality of real valued data symbols to a second to an (N/2)th subcarriers among N subcarriers (where N is an even natural number) on the basis of indices of the subcarriers; mapping real valued data symbols, each of which forms an Alamouti coded symbol pair with each of the real valued data symbols mapped to the second to the (N/2)th subcarriers, to an (N/2+2)th to an Nth subcarriers in a frequency reversal scheme with respect to an (N/2)th subcarrier; adjusting a phase of each of the real valued data symbols mapped to the second to the (N/2)th subcarriers using a first phase adjustment value based on indices of the mapped subcarriers and an index of a time interval in which each of the real valued data symbols is transmitted; and adjusting a phase of each of the real valued data symbols mapped to the (N/2+2)th to the Nth subcarriers using a second phase adjustment value that is a conjugate value of the first phase adjustment value for a real valued data symbol which forms an Alamouti coded symbol pair with the corresponding real valued data symbol.

The mapping in the frequency reversal scheme may include mapping the real valued data symbols forming the Alamouti coded symbol pairs to the (N/2+2)th to the Nth subcarriers such that each of the Alamouti coded symbol pairs is mapped to the subcarriers positioned symmetrically on a frequency axis on the basis of the (N/2+1)th subcarrier.

The first phase adjustment value may satisfy an Equation below $$\zeta_{l,m} = \begin{cases} 1(\text{or} - 1) & \text{if } l + m = \text{even} \\ j(\text{or} - j) & \text{if } l + m = \text{odd} \end{cases}$$

where l denotes a subcarrier index having a value between 1 and N/2−1, m denotes an index of the time interval and $\zeta_{l,m}$ denotes the first phase adjustment value, and the second phase adjustment value may satisfy an Equation below $$\zeta_{N-l,m} = \zeta_{l,m}^*$$

where $\zeta_{N-l,m}$ denotes the second phase adjustment value.

The Alamouti coding method may further include mapping a null data symbol to a first subcarrier and an (N/2+1)th subcarrier among the N subcarriers.

The Alamouti coding method may further include dividing all of available subcarriers into a plurality of sub-blocks consisting of the N subcarriers.

The number of sub-blocks may be determined based on a frequency selective fading channel characteristic.

According to still another exemplary embodiment, there is provided an Alamouti coding device including: a symbol mapper configured to map a plurality of real valued data symbols to a second to an (N/2)th subcarriers among N subcarriers (where N is an even natural number) on the basis of indices of the subcarriers, and map real valued data symbols, each of which forms an Alamouti coded symbol pair with each of the real valued data symbols mapped to the second to the (N/2)th subcarriers, to an (N/2+2)th to an Nth subcarriers in a frequency reversal scheme with respect to an (N/2)th subcarrier; and a phase adjuster configured to adjust a phase of each of the real valued data symbols mapped to the second to the (N/2)th subcarriers using a first phase adjustment value based on indices of the mapped subcarriers and an index of a time interval in which each of the real valued data symbols is transmitted, and adjust a phase of each of the real valued data symbols mapped to the (N/2+2)th to the Nth subcarriers using a second phase adjustment value that is a conjugate value of the first phase adjustment value for a real valued data symbol which forms an Alamouti coded symbol pair with the corresponding real valued data symbol.

The symbol mapper may map the real valued data symbols forming the Alamouti coded symbol pairs to the (N/2+2)th to the Nth subcarriers such that each of the Alamouti coded symbol pairs is mapped to the subcarriers positioned symmetrically on a frequency axis on the basis of the (N/2+1)th subcarrier.

The first phase adjustment value may satisfy an Equation below $$\zeta_{l,m} = \begin{cases} 1(\text{or} - 1) & \text{if } l + m = \text{even} \\ j(\text{or} - j) & \text{if } l + m = \text{odd} \end{cases}$$

where l denotes a subcarrier index having a value between 1 and N/2−1, m denotes an index of the time interval and $\zeta_{l,m}$ denotes the first phase adjustment value, and the second phase adjustment value may satisfy an Equation below $$\zeta_{N-l,m} = \zeta_{l,m}^*$$

where $\zeta_{N-l,m}$ denotes the second phase adjustment value.

The symbol mapper may map a null data symbol to a first subcarrier and an (N/2+1)th subcarrier among the N subcarriers.

The symbol mapper may divide all of available subcarriers into a plurality of sub-blocks consisting of the N subcarriers.

The number of sub-blocks may be determined based on a frequency selective fading channel characteristic.

According to the exemplary embodiments of the present invention, by applying an improved Alamouti coding scheme to a filter bank multi-carrier transmission scheme, it is possible to eliminate interference between subcarriers without complicated calculation process.

BRIEF DESCRIPTION OF THE DRAWINGS

FIG. 3 is an exemplary diagram for describing a mapping scheme of an Alamouti coded symbol according to one exemplary embodiment of the present invention.

FIG. 4 is an exemplary diagram for describing a mapping scheme of an Alamouti coded symbol according to another exemplary embodiment of the present invention.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art.

Descriptions of well-known functions and constructions may be omitted for increased clarity and conciseness. Also, terms described in below are selected by considering functions in the embodiment and meanings may vary depending on, for example, a user or operator's intentions or customs. Therefore, definitions of the terms should be made on the basis of the overall context. The terminology used in the detailed description is provided only to describe embodiments of the present disclosure and not for purposes of limitation. Unless the context clearly indicates otherwise, the singular forms include the plural forms. It should be understood that the terms "comprises" or "includes" specify some features, numbers, steps, operations, elements, and/or combinations thereof when used herein, but do not preclude the presence or possibility of one or more other features, numbers, steps, operations, elements, and/or combinations thereof in addition to the description.

Figure 1:
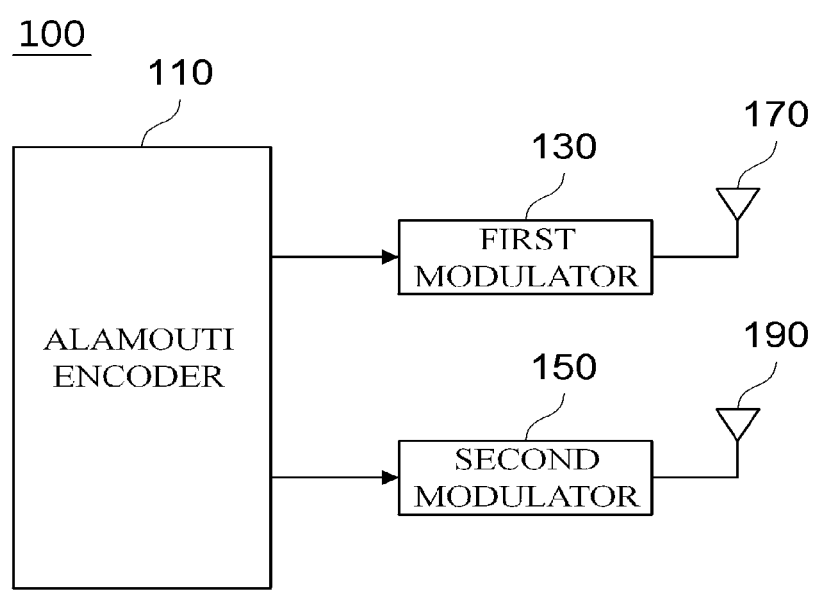
FIG. 1 is a diagram schematically illustrating a configuration of a filter bank multi-carrier (FBMC) transmission system according to one exemplary embodiment.

FIG. 1 is a diagram schematically illustrating a configuration of a filter bank multi-carrier (FBMC) transmission system 100 according to one exemplary embodiment of the present invention.

Referring to FIG. 1, an Alamouti encoder 110 generates Alamouti coded symbols from real valued data symbols according to the Alamouti coding scheme, which will be described below, and provides the Alamouti coded symbols to a first modulator 130 and a second modulator 150.

The first modulator 130 and the second modulator 150 modulate the Alamouti coded symbols received from the Alamouti encoder 110 according to an FBMC modulation scheme and transmit modulated signals through a transmission antenna A 170 and a transmission antenna B 190, respectively.

Figure 2:
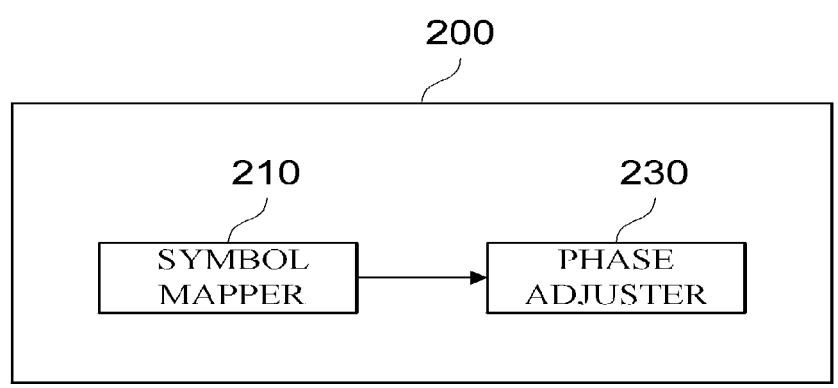
FIG. 2 is a diagram illustrating a configuration of an Alamouti encoding device according to one exemplary embodiment of the present invention.

FIG. 2 is a diagram illustrating a configuration of an Alamouti encoding device 200 according to one exemplary embodiment of the present invention.

The Alamouti encoding device 200 shown in FIG. 2 may correspond to, for example, the Alamouti encoder 110 shown in FIG. 1.

Referring to FIG. 2, the Alamouti encoding device 200 includes a symbol mapper 210 and a phase adjuster 230.

According to one exemplary embodiment of the present invention, the symbol mapper 210 maps a plurality of real valued data symbols to the first subcarrier to an (N/2−1)th subcarrier among N subcarriers (where N is an even natural number) on the basis of indices of the subcarriers.

Then, the symbol mapper 210 maps real valued data symbols, each of which forms an Alamouti pair with each of the real valued data symbols mapped to the first subcarrier to the (N/2−1)th subcarrier, to an (N/2+1)th to an (N−1)th subcarriers in a frequency reversal scheme with reference to an (N/2)th subcarrier.

In this case, the frequency reversal scheme means that two real valued data symbols constituting an Alamouti coded symbol pair are mapped to two subcarriers symmetrically positioned on a frequency axis with respect to the (N/2)th subcarrier among the N subcarriers.

Then, the symbol mapper 210 maps a null data symbol to the (N/2)th subcarrier and an Nth subcarrier of each transmission antenna.

Meanwhile, according to another exemplary embodiment of the present invention, the symbol mapper 210 maps a plurality of real valued data symbols to the second subcarrier to the (N/2)th subcarrier among N subcarriers (where N is an even natural number) on the basis of indices of the subcarriers.

Thereafter, the symbol mapper 210 maps real valued data symbols, each of which forms an Alamouti coded symbol pair with each of the real valued data symbols mapped to the second to the (N/2)th subcarriers, to an (N/2+2)th subcarrier to the Nth subcarrier, in a frequency reversal scheme with respect to the (N/2+1) the subcarrier.

Specifically, the symbol mapper 210 maps two real valued data symbols of the Alamouti coded symbol pair to two subcarriers symmetrically positioned on the frequency axis with respect to the (N/2+1)th subcarrier among N subcarriers.

Then, the symbol mapper 210 maps a null data symbol to the first subcarrier and the (N/2+1)th subcarrier of each transmission antenna.

Meanwhile, according to one exemplary embodiment of the present invention, the symbol mapper 210 may divide all of available subcarriers into a plurality of sub-blocks, and perform the above-described symbol mapping to each of the divided sub-blocks. In this case, N may denote the number of subcarriers consisting each of the sub-blocks, and the number of sub-blocks may be determined variably on the basis of a frequency-selective fading channel characteristics.

FIG. 3 is an exemplary diagram for describing a mapping scheme of an Alamouti coded symbol according to one exemplary embodiment of the present invention, and FIG. 4 is an exemplary diagram for describing a mapping scheme of an Alamouti coded symbol according to another exemplary embodiment of the present invention.

In FIGS. 3 and 4, k denotes a subcarrier index, and n denotes an index of time interval in which each of the Alamouti coded symbols is transmitted.

In addition, $(x_{k,n}, y_{k,n})$ denotes a real valued data symbol pair to be Alamouti coded and transmitted through kth subcarriers in an nth time interval of the transmission antenna A 170 and the transmission antenna B 190. In this case, energy $E[|x_{k,n}|^2]$ and $E[|y_{k,n}|^2]$ of each of the real valued data symbols is given as $E_b \log_2 \sqrt{Q}$ and Q denotes OQAM (Offset Quadrature Amplitude Modulation) symbol energy.

Moreover, $a_{k,n}$ and $b_{k,n}$ denote Alamouti coded symbols to be transmitted from the transmission antenna A 170 and the transmission antenna B 190, respectively, through the kth subcarriers in the nth time interval.

Referring to FIG. 3, the symbol mapper 210 maps $x_{k,n}$ to the first (i.e., k=1) subcarrier to an (N/2−1)th subcarrier among the subcarriers of the transmission antenna A 170 and maps $y_{k,n}$ to the first (i.e., k=1) subcarrier to an (N/2−1)th subcarrier among the subcarriers of the transmission antenna B.

Thereafter, the symbol mapper 210 maps $-y_{k,n}$, which forms an Alamouti coded symbol pair with $x_{k,n}$, to an (N/2+1)th subcarrier to an (N−1)th subcarrier among the subcarriers of the transmission antenna A 170. In this case, the $-y_{k,n}$ is mapped to a subcarrier positioned symmetrically to a subcarrier to which $x_{k,n}$ is mapped on the frequency axis with respect to an (N/2)th subcarrier That is, as the illustrated example, $-y_{1,1}$ that forms an Alamouti coded symbol pair with $x_{1,1}$ mapped to the first subcarrier of the transmission antenna A 170 is mapped to an (N−1)th subcarrier positioned symmetrically to the first subcarrier on the frequency axis with respect to the (N/2)th subcarrier. In the same manner, $-y_{2,1}$ that forms an Alamouti coded symbol pair with $x_{2,1}$ mapped to the second subcarrier is mapped to an (N−2)th subcarrier positioned symmetrically to the second subcarrier on the frequency axis with respect to the (N/2)th subcarrier.

In addition, the symbol mapper 210 maps $x_{k,n}$ that forms an Alamouti coded symbol pair with $y_{k,n}$ to an (N/2+1)th subcarrier to an (N−1)th subcarrier among the subcarriers of the transmission antenna B 190. In this case, the $x_{k,n}$ is mapped to a subcarrier positioned symmetrically to a subcarrier to which the $y_{k,n}$ is mapped on the frequency axis with respect to the (N/2)th subcarrier.

That is, as the illustrated example, $x_{1,1}$ that forms an Alamouti coded symbol pair with $y_{1,1}$ mapped to the first subcarrier of the transmission antenna B 190 is mapped to the (N−1)th subcarrier positioned symmetrically to the first subcarrier on the frequency axis with respect to the (N/2)th subcarrier, and $x_{2,1}$ that forms an Alamouti coded symbol pair with $y_{2,1}$ is mapped to an (N−2)th subcarrier positioned symmetrically to the second subcarrier with respect to the (N/2)th subcarrier.

Meanwhile, a null data symbol having a value of 0 is mapped to each of the (N/2)th subcarrier and the Nth subcarrier of each of the transmission antenna A 170 and the transmission Antenna B 190.

Referring to FIG. 4, the symbol mapper 210 maps $x_{k,n}$ to the second (i.e., k=2) subcarrier to an (N/2)th subcarrier among the subcarriers of the transmission antenna A 170 and maps $y_{k,n}$ to the second (i.e., k=2) subcarrier to an (N/2)th subcarrier among the subcarriers of the transmission antenna B 190.

Then, the symbol mapper 210 maps $-y_{k,n}$ that forms an Alamouti coded symbol pair with the $x_{k,n}$ to an (N/2+2)th subcarrier to an Nth subcarrier among the subcarriers of the transmission antenna A 170. In this case, the $-y_{k,n}$ is mapped to a subcarrier positioned symmetrically to a subcarrier to which the $x_{k,n}$ is mapped on the frequency axis with respect to the (N/2+1)th subcarrier.

That is, as the illustrated example, $-y_{2,1}$ that forms an Alamouti coded symbol pair with $x_{2,1}$ mapped to the second subcarrier of the transmission antenna A 170 is mapped to the Nth subcarrier positioned symmetrically to the second subcarrier on the frequency axis with respect to the (N/2+1)th subcarrier. In the same manner, $-y_{3,1}$ that forms an Alamouti coded symbol pair with $x_{3,1}$ mapped to the third subcarrier is mapped to an (N−1)th subcarrier positioned symmetrically to the third subcarrier on the frequency axis with respect to the (N/2+1)th subcarrier.

In addition, the symbol mapper 210 maps $x_{k,n}$ that forms an Alamouti coded symbol pair with $y_{k,n}$ to an (N/2+2)th subcarrier to an Nth subcarrier among the subcarriers of the transmission antenna B 190. In this case, the $x_{k,n}$ is mapped to a subcarrier positioned symmetrically to a subcarrier to which the $y_{k,n}$ is mapped on the frequency axis with respect to an (N/2+1)th subcarrier.

That is, as the illustrated example, $x_{2,1}$ that forms an Alamouti coded symbol pair with $y_{2,1}$ mapped to the second subcarrier of the transmission antenna B 190 is mapped to an Nth subcarrier positioned symmetrically to the second subcarrier on the frequency axis with respect to the (N/2+1)th subcarrier, and $x_{3,1}$ that forms an Alamouti coded symbol pair with $y_{3,1}$ is mapped to an (N−1)th subcarrier positioned symmetrically to the third subcarrier with respect to the (N/2+1)th subcarrier.

Meanwhile, a null data symbol having a value of 0 is mapped to each of the first subcarrier and the (N/2+1)th subcarrier of each of the transmission antenna A 170 and the transmission Antenna B 190.

The Alamouti coded symbol pairs (i.e., $(a_{k,n}, a_{N-k,n})$ and $(b_{k,n}, b_{N-k,n})$) of the respective transmission antennas which are generated according to the scheme illustrated in FIG. 3 or FIG. 4 form an Alamouti code structure as shown in Equation 1 below.

$$\begin{pmatrix} a_{k,n} & a_{N-k,n} \\ b_{k,n} & b_{N-k,n} \end{pmatrix} = \begin{pmatrix} x_{k,n} & -y_{k,n} \\ y_{k,n} & x_{k,n} \end{pmatrix} \quad \text{[Equation 1]}$$

The phase adjuster 230 adjusts a phase of each of the real valued data symbols mapped to the first to the (N/2−1)th subcarriers (when mapped according to the scheme illustrated in FIG. 3) or a phase of each of the real valued data symbols mapped to the second to the (N/2)th subcarriers (when mapped according to the scheme illustrated in FIG. 4) using a first phase adjustment value based on indices of the subcarriers to which the real valued data symbols are mapped and an index of a time interval in which each of the data symbols is transmitted.

Then, the phase adjuster 230 adjusts a phase of each of the real valued data symbols mapped to the (N/2+1)th to the (N−1)th subcarriers (when mapped according to the scheme illustrated in FIG. 3) or a phase of each of the real valued data symbols mapped to the (N/2+2)th to the Nth subcarriers (when mapped according to the scheme illustrated in FIG. 4) using a second phase adjustment value that is a conjugate value of the first phase adjustment value for a real valued data symbol that forms an Alamouti coded symbol pair with the corresponding real valued data symbol.

Specifically, signals as shown in Equation 2 and Equation 3 below are transmitted from the transmission antenna A and the transmission antenna B through a typical FBMC modulation rule.

$$s_a(t) = \sum_{l=1}^{N-1} \sum_{m=-\infty}^{\infty} a_{l,m} \zeta_{l,m} p\left(t - \frac{T}{2}m\right) e^{j\frac{2\pi lt}{T}} \quad \text{[Equation 2]}$$

$$s_b(t) = \sum_{l=1}^{N-1} \sum_{m=-\infty}^{\infty} b_{l,m} \zeta_{l,m} p\left(t - \frac{T}{2}m\right) e^{j\frac{2\pi lt}{T}} \quad \text{[Equation 3]}$$

In Equations 2 and 3, T denotes a symbol period of an OQAM signal, N denotes the number of subcarriers, l denotes a subcarrier index, m denotes an index of an antenna time interval, and p(t) denotes a frequency-localized FBMC pulse having a unit energy.

In addition, $\zeta_{l,m}$ denotes a phase adjustment value that varies between 1 (or −1) and j (or −j) on the time and frequency axes in order to form an OQAM signal from the real valued data symbols $a_{l,m}$ and $b_{l,m}$.

The phase adjuster 230 adjusts a phase of each of the real valued data symbols mapped to the first to the (N/2−1)th subcarriers by the symbol mapper 210 (when mapped according to the scheme illustrated in FIG. 3) or a phase of each of the real valued data symbols mapped to the second to the (N/2)th subcarriers (when mapped according to the scheme illustrated in FIG. 4) using a phase adjustment value $\zeta_{l,m}$ which conforms to a rule as shown in Equation 4 below.

$$\zeta_{l,m} = \begin{cases} 1(\text{or} - 1) & \text{if } l + m = \text{even} \\ j(\text{or} - j) & \text{if } l + m = \text{odd} \end{cases} \quad \text{[Equation 4]}$$

where l satisfies $$1 \leq l \leq \frac{N}{2} - 1$$

in the case of mapping according to the scheme illustrated in FIG. 3 and satisfies $$2 \leq l \leq \frac{N}{2}$$

in the case of mapping according to the scheme illustrated in FIG. 4.

On the other hand, since there is no restriction on a polarity of the phase adjustment value, there may be various patterns that satisfy the rule of Equation 4.

In addition, the phase adjuster 230 adjusts a phase of each of the real valued data symbols mapped to the (N/2+1)th of the subcarrier to the (N−1)th subcarrier by the symbol mapper 210 (when mapped according to the scheme illustrated in FIG. 3) or a phase of each of the real valued data symbols mapped to the (N/2+2)th to the Nth subcarriers (when mapped according to the scheme illustrated in FIG. 4) using a phase adjustment value $\zeta_{N-l,m}$ that satisfies Equation 5 below.

$$\zeta_{N-l,m} = \zeta_{l,m}^* \qquad \text{[Equation 5]}$$

where l satisfies $$1 \leq l \leq \frac{N}{2} - 1$$

in the case of mapping according to the scheme illustrated in FIG. 3 and satisfies $$2 \leq l \leq \frac{N}{2}$$

in the case of mapping according to the scheme illustrated in FIG. 4.

Thus, when $\alpha_{l,m}$ and $\beta_{l,m}$ are represented by phase-adjusted Alamouti coded symbols $\alpha_{l,m}\zeta_{l,m}$ and $b_{l,m}\zeta_{l,m}$, respectively, it is seen that $\alpha_{l,m}$ and $\beta_{l,m}$ still satisfy the Alamouti code structure as shown in Equation 6 below.

$$\begin{pmatrix} \alpha_{l,m} & \alpha_{N-l,m} \\ \beta_{l,m} & \beta_{N-l,m} \end{pmatrix} =$$

$$\begin{pmatrix} a_{l,m}\zeta_{l,m} & a_{N-l,m}\zeta_{N-l,m} \\ b_{l,m}\zeta_{l,m} & b_{N-l,m}\zeta_{N-l,m} \end{pmatrix} = \begin{pmatrix} x_{l,m}\zeta_{l,m} & -y_{l,m}\zeta_{l,m}^*(=-(y_{l,m}\zeta_{l,m})^*) \\ y_{l,m}\zeta_{l,m} & x_{l,m}\zeta_{l,m}^*(=(x_{l,m}\zeta_{l,m})^*) \end{pmatrix}$$

Meanwhile, in one exemplary embodiment of the present invention, the symbol mapper 210 and the phase adjuster 230 may be implemented on a computing device that includes one or more processors and a computer-readable recording medium connected to the processors. The computer-readable recording medium may be present inside or outside processors and be connected to the processors by various well-known means. The processors present inside the computing device may allow the computing device to operate according to an exemplary embodiment described herein. For example, the processors may execute an instruction stored in the computer-readable recording medium, and the instruction stored in the computer-readable recording medium may be configured to allow the computing device to execute operations according to the exemplary embodiments described herein when executed by the processors.

In addition, the symbol mapper 210 and the phase adjuster 230 are distinguished according to the function performed and are not necessarily implemented by separate devices physically divided from each other, and they may not be clearly distinguished in a specific operation.

Figure 5:
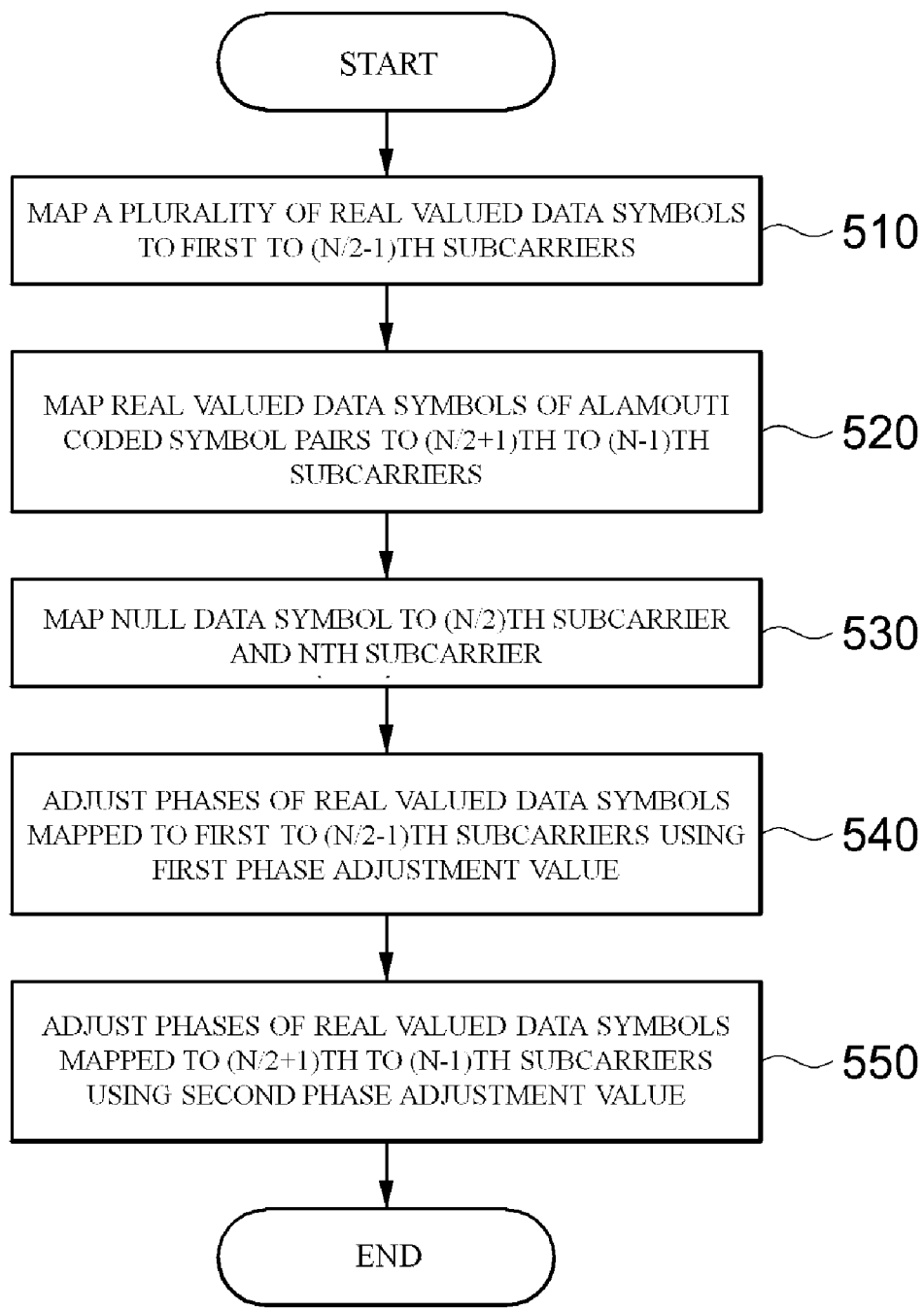
FIG. 5 is a flowchart of an Alamouti coding method according to one exemplary embodiment of the present invention.

FIG. 5 is a flowchart of an Alamouti coding method according to one exemplary embodiment of the present invention.

The method shown in FIG. 5 may be performed by the Alamouti coding device 200 shown in FIG. 2.

Referring to FIG. 5, the Alamouti coding device 200 maps a plurality of real valued data symbols to the first to an (N/2−1)th subcarriers among N subcarriers (where N is an even natural number) on the basis of indices of the subcarriers (510).

In this case, according to one exemplary embodiment of the present invention, the symbol mapper 210 may divide all of available subcarriers into a plurality of sub-blocks, and perform the above-described symbol mapping to each of the divided sub-blocks. In this case, N may denote the number of subcarriers consisting each of the sub-blocks, and the number of sub-blocks may be determined variably on the basis of a frequency-selective fading channel characteristics.

Thereafter, the Alamouti coding device 200 maps real valued data symbols each of which forms an Alamouti pair with each of the real valued data symbols mapped to the first subcarrier to the (N/2−1)th subcarrier to an (N/2+1)th to an (N−1)th subcarriers, in a frequency reversal scheme with reference to an (N/2)th subcarrier (520).

Then, the Alamouti coding device 200 maps a null data symbol to the (N/2)th subcarrier and an Nth subcarrier (530).

Then, the Alamouti coding device 200 adjusts a phase of each of the real valued data symbols mapped to the first to the (N/2−1)th subcarriers using a first phase adjustment value based on indices of the subcarriers to which the real valued data symbols are mapped and an index of a time interval in which each of the data symbols is transmitted (540).

Thereafter, the Alamouti coding device 200 adjusts a phase of each of the real valued data symbols mapped to the (N/2+1)th to the (N−1)th subcarriers using a second phase adjustment value that is a conjugate value of the first phase adjustment value for a real valued data symbol that forms an Alamouti coded symbol pair with the corresponding real valued data symbol (550).

Figure 6:
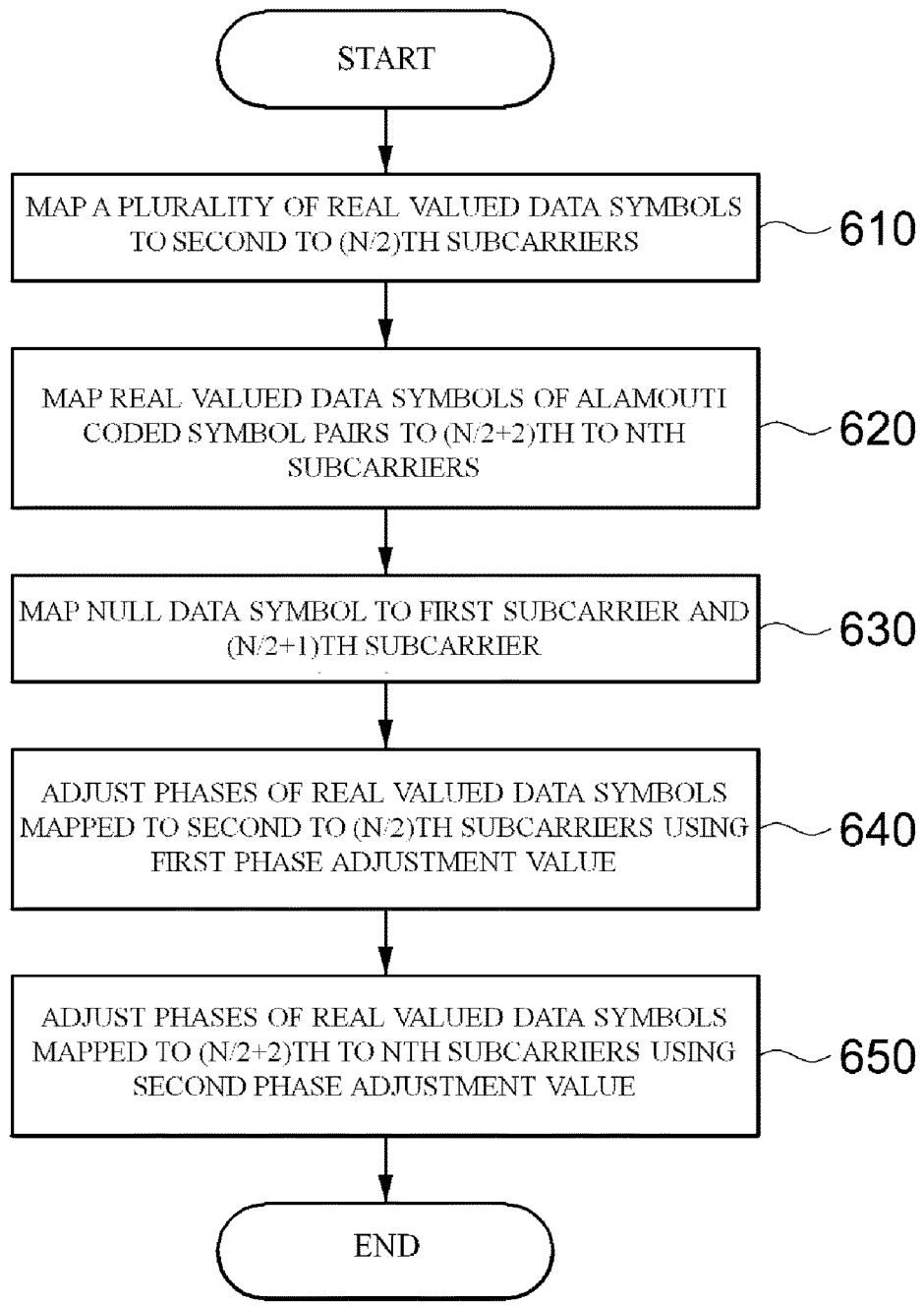
FIG. 6 is a flowchart of an Alamouti coding method according to another exemplary embodiment of the present invention.

FIG. 6 is a flowchart of an Alamouti coding method according to another exemplary embodiment of the present invention.

The method illustrated in FIG. 6 may be performed by the Alamouti coding device 200 shown in FIG. 2.

Referring to FIG. 6, the Alamouti coding device 200 maps a plurality of real valued data symbols to the second to an (N/2)th subcarriers among N subcarriers (where N is an even natural number) on the basis of indices of the subcarriers (610).

In this case, according to one exemplary embodiment of the present invention, the symbol mapper 210 may divide all of available subcarriers into a plurality of sub-blocks, and perform the above-described symbol mapping to each of the divided sub-blocks. In this case, N may denote the number of subcarriers consisting each of the sub-blocks, and the number of sub-blocks may be determined variably on the basis of a frequency-selective fading channel characteristics.

Then, the Alamouti coding device 200 maps real valued data symbols, each of which forms an Alamouti coded symbol pair with each of the real valued data symbols mapped to the second to the (N/2)th subcarriers, to an (N2+2)th to an Nth subcarriers in a frequency reversal scheme with respect to the (N/2+1) the subcarrier (620).

Then, the Alamouti coding device 200 maps a null data symbol to each of the first subcarrier and the (N/2+1)th subcarrier (630).

Then, the Alamouti coding device 200 adjusts a phase of each of the real valued data symbols mapped to the second to the (N/2)th subcarriers using a first phase adjustment value based on indices of the subcarriers to which the real valued data symbols are mapped and an index of a time interval in which each of the data symbols is transmitted (640).

Thereafter, the Alamouti coding device 200 adjusts a phase of each of the real valued data symbols mapped to the (N/2+2)th to the Nth subcarriers using a second phase adjustment value that is a conjugate value of the first phase adjustment value for a real valued data symbol which forms an Alamouti coded symbol pair with the corresponding real valued data symbol (650).

Meanwhile, in the flowcharts illustrated in FIGS. 5 and 6, the method is described as being divided into a plurality of operations. However, it should be noted that at least some of the operations may be performed in different order or may be combined into fewer operations or further divided into more operations. In addition, some of the operations may be omitted, or one or more extra operations, which are not illustrated, may be added to the flowchart and be performed.

Figure 7:
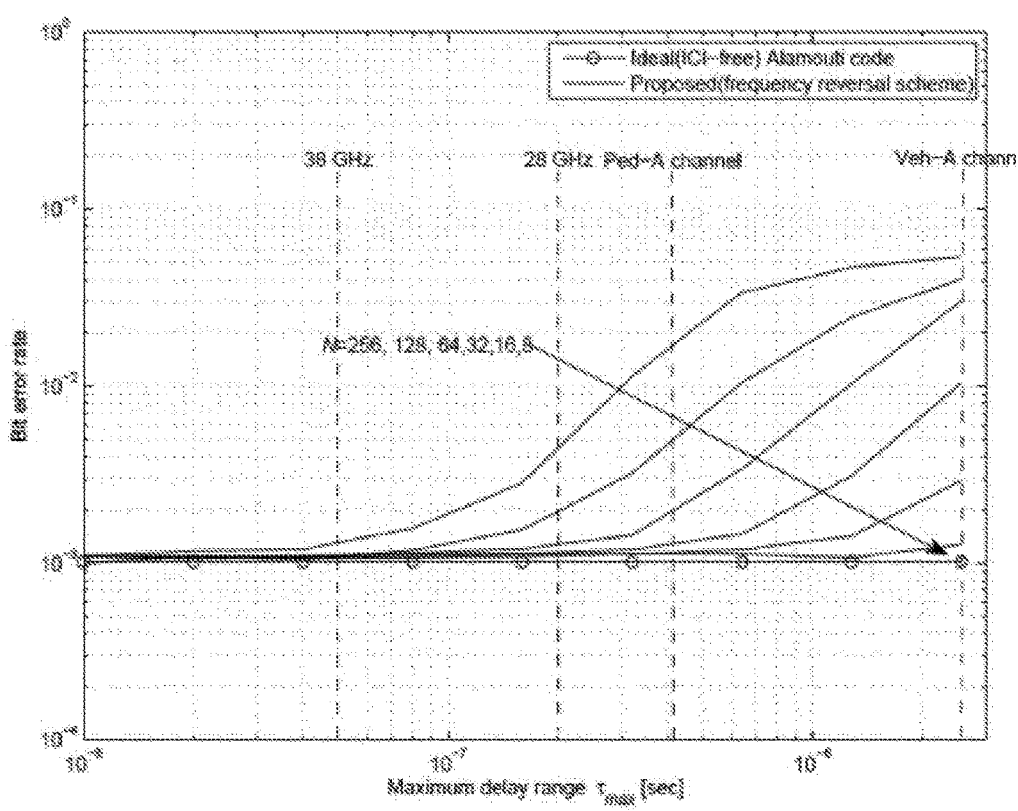
FIGS. 7 to 9 are graphs showing results of simulating a bit error rate (BER) under a multipath fading channel using Alamouti coding.
Figure 8:
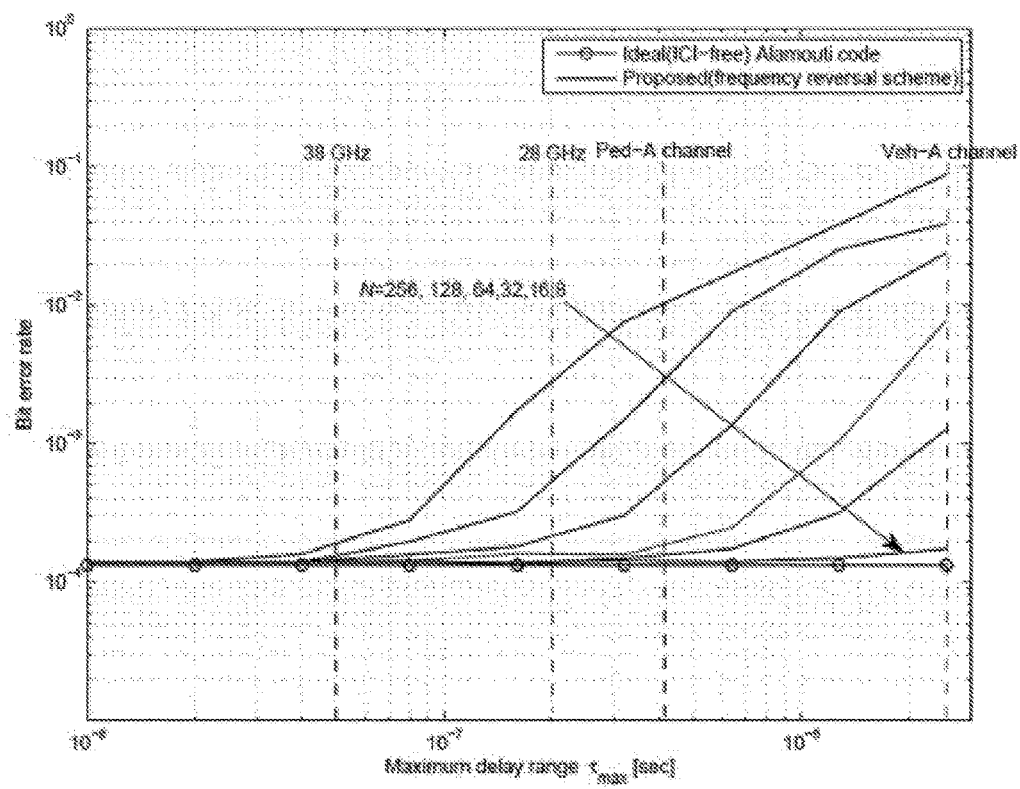
Figure 9:
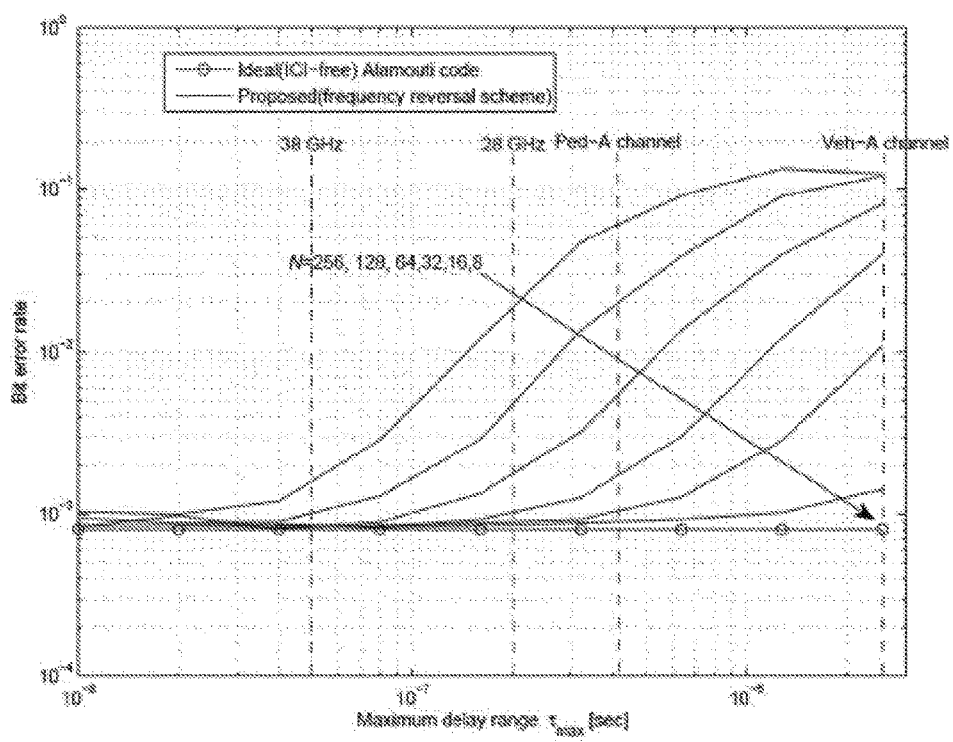

FIGS. 7 to 9 are graphs showing results of simulating a bit error rate (BER) under a multipath fading channel using Alamouti coding.

Specifically, FIGS. 7 to 9 show the results of simulating a BER according to a maximum delay range $\tau_{max}$ and the number N of subcarriers with respect to different SNRs and different modulation orders.

In the simulations shown in FIGS. 7 to 9, the number L of multipaths was set to 5. In addition, a delay of the first arriving path was set to 0 and the remaining L−1 multipaths were uniformly distributed to values ranging between 0 and $\tau_{max}$ (where $\tau_{max}$ is a maximum delay range). A path power was set to exponentially decrease from 0 dB at t=0 to −20 dB at t=$\tau_{max}$. In addition, subcarrier spacing $f_A(=1/T)$ is set to 15 kHz.

Multipath delay profiles which have 410 ns and 2500 ns as $\tau_{max}$, respectively, are similar to an ITU-R pedestrian-A channel model (hereinafter referred to as a Ped-A channel model) and an ITU-R vehicular A channel model (hereinafter referred to as a Veh-A channel model), respectively.

Basically, in FIGS. 7 to 9, as the maximum delay range decreases, the BER of the Alamouti coding scheme according to the exemplary embodiment of the present invention converges to a BER of an ideal Alamouti coding scheme free from inter-carrier interference (ICI). This confirms a complete self-ICI cancellation characteristic for a locally flat channel.

Meanwhile, as the maximum delay range increases, the BER of the Alamouti coding scheme according to the exemplary embodiment of the present invention gradually increases. This is because self-ICI cancellation does not take place since a fading coefficient of each subcarrier in a coded block deviates from a constant value due to frequency selectivity.

On the other hand, when the entire subcarriers are divided into a plurality of sub-blocks and the Alamouti coding scheme according to the exemplary embodiment of the present invention is applied to each of the sub-blocks, it is possible to reduce N. When the N is appropriately reduced according to the maximum delay range (i.e., the frequency selectivity), the Alamouti coding scheme according to the exemplary embodiment of the present invention still can achieve an ICI performance close to an ideal Alamouti code.

For example, for $\tau_{max}$=0.41 s, which closely matches the Ped-A channel model, if N is set to 32 for OQPSK and 16 for 16-OQAM, respectively, the Alamouti coding scheme according to the exemplary embodiment of the present invention may achieve an ICI performance close to the ideal Alamouti code. These settings result in data rate losses of 6.25% and 12.5%, respectively. A block size N should not be set to more than 8 for the ICI performance close to the ideal Alamouti code for=2.5 μs, which closely matches the Veh-A channel model.

As a mm-wave band is recently considered to be used in 5G wireless systems, a lower limit of the maximum delay range of interest in FIGS. 7 to 9 was set to 10 ns.

Meanwhile, for 28 GHz and 38 GHz, $\tau_{max}$ may be set to 200 ns and 50 ns, respectively. To achieve an ICI performance close to the ideal Alamouti code at 28 GHz (i.e., $\tau_{max}$=250 ns), N may be set to 64 (data loss of about 3%) and 32 for OQPSK and 16-OQAM, respectively. In addition, to achieve an ICI performance close to the ideal Alamouti code at 38 GHz (i.e., $\tau_{max}$=50 ns), N may be set to 256 (data loss of about 0.8%) and 128 (data loss of about 1.8%) for OQPSK and 16-OQAM, respectively.

Not the block size N itself, but a physical bandwidth of a frequency reversal-coded block needs to be changed according to the channel selectivity in order to satisfy a condition of locally flat fading in the frequency reversal-coded block.

For example, as described above, it is mentioned that the N does not have to be set to more than 8 in order to achieve the ICI performance close to an ideal Alamouti code in a Veh-A channel, but this is merely the case where the subcarrier spacing is set to 15 kHz. If the subcarrier spacing is reduced or if symbol duration is equally increased and a quasi-static fading condition for the increased symbol duration is not broken, the maximum N that can attain the ICI performance close to an ideal Alamouti code increases in inverse proportion to the subcarrier spacing.

More generally, the maximum N that can attain the ICI performance close to an ideal Alamouti code for a system in which the subcarrier spacing $f_A(=1/T)$ is not 15 kHz may be simply obtained by scaling $15e^3/f_A$ to the maximum N for the subcarrier spacing of 15 kHz. Therefore, if the subcarrier spacing is appropriately reduced, the maximum N can be increased while maintaining the same BER performance. Such a scaling rule mitigates data loss issues in severe selective fading channels.

The methods and/or operations described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An Alamouti coding method comprising:
   mapping a plurality of real valued data symbols to a first to an (N/2−1)th subcarriers among N subcarriers, where N is an even natural number, on the basis of indices of the subcarriers;
   mapping real valued data symbols, each of which forms an Alamouti pair with each of the real valued data symbols mapped to the first subcarrier to the (N/2−1)th subcarrier, to an (N/2+1)th to an (N−1)th subcarriers in a frequency reversal scheme with reference to an (N/2)th subcarrier;
   adjusting a phase of each of the real valued data symbols mapped to the first to the (N/2−1)th subcarriers using a first phase adjustment value based on indices of the mapped subcarriers and an index of a time interval in which each of the data symbols is transmitted; and
   adjusting a phase of each of the real valued data symbols mapped to the (N/2+1)th to the (N−1)th subcarriers using a second phase adjustment value that is a conjugate value of the first phase adjustment value for a real valued data symbol which forms an Alamouti coded symbol pair with the corresponding real valued data symbol.

2. The Alamouti coding method of claim 1, wherein the mapping in the frequency reversal scheme includes mapping the real valued data symbols forming the Alamouti coded symbol pairs to the (N/2+1)th to the (N−1)th subcarriers such that each of the Alamouti coded symbol pairs is mapped to the subcarriers positioned symmetrically on a frequency axis on the basis of the (N/2)th subcarrier.

3. The Alamouti coding method of claim 1, wherein the first phase adjustment value satisfies an Equation below $$\zeta_{l,m} = \begin{cases} 1(\text{or} - 1) \text{ if } l + m = \text{even} \\ j(\text{or} - j) \text{ if } l + m = \text{odd} \end{cases}$$

where l denotes a subcarrier index having a value between 1 and N/2−1, m denotes an index of the time interval and $\zeta_{l,m}$ denotes the first phase adjustment value, and the second phase adjustment value satisfies an Equation below $$\zeta_{N-l,m} = \zeta_{l,m}^*$$

where $\zeta_{N-l,m}$ denotes the second phase adjustment value.

4. The Alamouti coding method of claim 1, further comprising mapping a null data symbol to the (N/2)th subcarrier and an Nth subcarrier among the N subcarriers.

5. The Alamouti coding method of claim 4, wherein the number of sub-blocks is determined based on a frequency selective fading channel characteristic.

6. The Alamouti coding device of claim 5, wherein the symbol mapper maps the real valued data symbols forming the Alamouti coded symbol pairs to the (N/2+1)th to the (N−1)th subcarriers such that each of the Alamouti coded symbol pairs is mapped to the subcarriers positioned symmetrically on a frequency axis on the basis of the (N/2)th subcarrier.

7. The Alamouti coding device of claim 5, wherein the first phase adjustment value satisfies an Equation below $$\zeta_{l,m} = \begin{cases} 1(\text{or} - 1) \text{ if } l + m = \text{even} \\ j(\text{or} - j) \text{ if } l + m = \text{odd} \end{cases}$$

where l denotes a subcarrier index having a value between 1 and N/2−1, m denotes an index of the time interval and $\zeta_{l,m}$ denotes the first phase adjustment value, and the second phase adjustment value satisfies an Equation below $$\zeta_{N-l,m} = \zeta_{l,m}^*$$

where $\zeta_{N-l,m}$ denotes the second phase adjustment value.

8. The Alamouti coding device of claim 5, wherein the symbol mapper maps a null data symbol to the (N/2)th subcarrier and an Nth subcarrier among the N subcarriers.

9. The Alamouti coding device of claim 5, wherein the symbol mapper divides all of available subcarriers into a plurality of sub-blocks consisting of the N subcarriers.

10. The Alamouti coding device of claim 9, wherein the number of sub-blocks is determined based on a frequency selective fading channel characteristic.

11. The Alamouti coding method of claim 1, further comprising dividing all of available subcarriers into a plurality of sub-blocks consisting of the N subcarriers.

12. An Alamouti coding device comprising:
    a symbol mapper configured to map a plurality of real valued data symbols to a first to an (N/2−1)th subcarriers among N subcarriers on the basis of indices of the subcarriers and map real valued data symbols, each of which forms an Alamouti coded symbol pair with each of the real valued data symbols mapped to the first to the (N/2−1)th subcarriers, to an (N/2+1)th to an (N−1)th subcarriers in a frequency reversal scheme with respect to an (N/2)th subcarrier; and
    a phase adjuster configured to adjust a phase of each of the real valued data symbols mapped to the first to the (N/2−1)th subcarriers using a first phase adjustment value based on indices of the mapped subcarriers and an index of a time interval in which each of the data symbols is transmitted, and adjust a phase of each of the real valued data symbols mapped to the (N/2+1)th to the (N−1)th subcarriers using a second phase adjustment value that is a conjugate value of the first phase adjustment value for a real valued data symbol which forms an Alamouti coded symbol pair with the corresponding real valued data symbol.

13. An Alamouti coding method comprising:
    mapping a plurality of real valued data symbols to a second to an (N/2)th subcarriers among N subcarriers, where N is an even natural number, on the basis of indices of the subcarriers;
    mapping real valued data symbols, each of which forms an Alamouti coded symbol pair with each of the real valued data symbols mapped to the second to the (N/2)th subcarriers, to an (N/2+2)th to an Nth subcarriers in a frequency reversal scheme with respect to an (N/2)th subcarrier;

adjusting a phase of each of the real valued data symbols mapped to the second to the (N/2)th subcarriers using a first phase adjustment value based on indices of the mapped subcarriers and an index of a time interval in which each of the real valued data symbols is transmitted; and adjusting a phase of each of the real valued data symbols mapped to the (N/2+2)th to the Nth subcarriers using a second phase adjustment value that is a conjugate value of the first phase adjustment value for a real valued data symbol which forms an Alamouti coded symbol pair with the corresponding real valued data symbol.

14. The Alamouti coding method of claim 13, wherein the mapping in the frequency reversal scheme includes mapping the real valued data symbols forming the Alamouti coded symbol pairs to the (N/2+2)th to the Nth subcarriers such that each of the Alamouti coded symbol pairs is mapped to the subcarriers positioned symmetrically on a frequency axis on the basis of the (N/2+1)th subcarrier.

15. The Alamouti coding method of claim 13, wherein the first phase adjustment value satisfies an Equation below $$\zeta_{l,m} = \begin{cases} 1(\text{or} - 1) & \text{if } l + m = \text{even} \\ j(\text{or} - j) & \text{if } l + m = \text{odd} \end{cases}$$

where l denotes a subcarrier index having a value between 1 and N/2−1, m denotes an index of the time interval and $\zeta_{l,m}$ denotes the first phase adjustment value, and the second phase adjustment value satisfies an Equation below $$\zeta_{N-l,m} = \zeta_{l,m}{}^*$$

where $\zeta_{N-l,m}$ denotes the second phase adjustment value.

16. The Alamouti coding method of claim 13, further comprising mapping a null data symbol to a first subcarrier and an (N/2+1)th subcarrier among the N subcarriers.

17. The Alamouti coding method of claim 13, further comprising dividing all of available subcarriers into a plurality of sub-blocks consisting of the N subcarriers.

18. The Alamouti coding method of claim 17, wherein the number of sub-blocks is determined based on a frequency selective fading channel characteristic.

19. An Alamouti coding device comprising:

a symbol mapper configured to map a plurality of real valued data symbols to a second to an (N/2)th subcarriers among N subcarriers, where N is an even natural number, on the basis of indices of the subcarriers, and map real valued data symbols, each of which forms an Alamouti coded symbol pair with each of the real valued data symbols mapped to the second to the (N/2)th subcarriers, to an (N/2+2)th to an Nth subcarriers in a frequency reversal scheme with respect to an (N/2)th subcarrier; and a phase adjuster configured to adjust a phase of each of the real valued data symbols mapped to the second to the (N/2)th subcarriers using a first phase adjustment value based on indices of the mapped subcarriers and an index of a time interval in which each of the real valued data symbols is transmitted, and adjust a phase of each of the real valued data symbols mapped to the (N/2+2)th to the Nth subcarriers using a second phase adjustment value that is a conjugate value of the first phase adjustment value for a real valued data symbol which forms an Alamouti coded symbol pair with the corresponding real valued data symbol.

20. The Alamouti coding device of claim 19, wherein the symbol mapper maps the real valued data symbols forming the Alamouti coded symbol pairs to the (N/2+2)th to the Nth subcarriers such that each of the Alamouti coded symbol pairs is mapped to the subcarriers positioned symmetrically on a frequency axis on the basis of the (N/2+1)th subcarrier.

21. The Alamouti coding device of claim 19, wherein the first phase adjustment value satisfies an Equation below $$\zeta_{l,m} = \begin{cases} 1(\text{or} - 1) & \text{if } l + m = \text{even} \\ j(\text{or} - j) & \text{if } l + m = \text{odd} \end{cases}$$

where l denotes a subcarrier index having a value between 1 and N/2−1, m denotes an index of the time interval and $\zeta_{l,m}$ denotes the first phase adjustment value, and the second phase adjustment value satisfies an Equation below $$\zeta_{N-l,m} = \zeta_{l,m}{}^*$$

where $\zeta_{N-l,m}$ denotes the second phase adjustment value.

22. The Alamouti coding device of claim 19, wherein the symbol mapper maps a null data symbol to a first subcarrier and an (N/2+1)th subcarrier among the N subcarriers.

23. The Alamouti coding device of claim 19, wherein the symbol mapper divides all of available subcarriers into a plurality of sub-blocks consisting of the N subcarriers.

24. The Alamouti coding device of claim 23, wherein the number of sub-blocks is determined based on a frequency selective fading channel characteristic.

\* \* \* \* \*